United States Patent

Land et al.

[11] 4,072,968
[45] Feb. 7, 1978

[54] SELF-RETRACTING IMBIBITION CHAMBER FOR CAMERAS AND METHOD OF MAKING THE SAME

[75] Inventors: Edwin H. Land, Cambridge; Albert J. Bachelder, Lexington, both of Mass.; Sarah H. Perry, Northfield, Minn.

[73] Assignee: Polaroid Corporation, Cambridge, Mass.

[21] Appl. No.: 680,781

[22] Filed: Apr. 27, 1976

[51] Int. Cl.² .................................... G03B 17/50
[52] U.S. Cl. .................................... 354/86; 354/277; 354/354
[58] Field of Search ............ 354/86, 83, 288, 275–277, 354/304, 354

[56] References Cited

U.S. PATENT DOCUMENTS

| | | | |
|---|---|---|---|
| 3,653,308 | 4/1972 | Erlichman | 354/86 |
| 3,896,469 | 7/1975 | Mather | 354/86 X |
| 3,938,167 | 2/1976 | Amey et al. | 354/86 |
| 3,996,595 | 12/1976 | Ivester | 354/83 |

Primary Examiner—Richard L. Moses
Attorney, Agent, or Firm—Edward S. Roman

[57] ABSTRACT

A compact, self-retracting imbibition chamber for cameras in which the film is ejected just after exposure and passed through processing units which distribute processing fluid throughout the film unit. The apparatus includes a normally tightly coiled imbibition chamber which receives the sheet ejected from the processing rolls and retains it in a light-protected condition until it is sufficiently processed to allow it to be exposed to the light.

11 Claims, 8 Drawing Figures

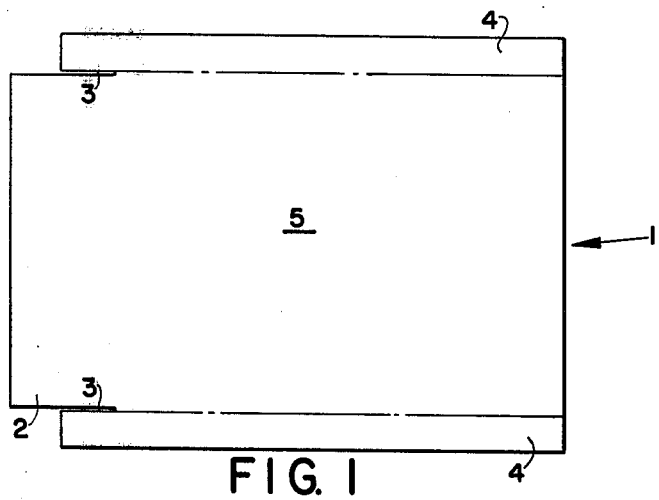
FIG. 1
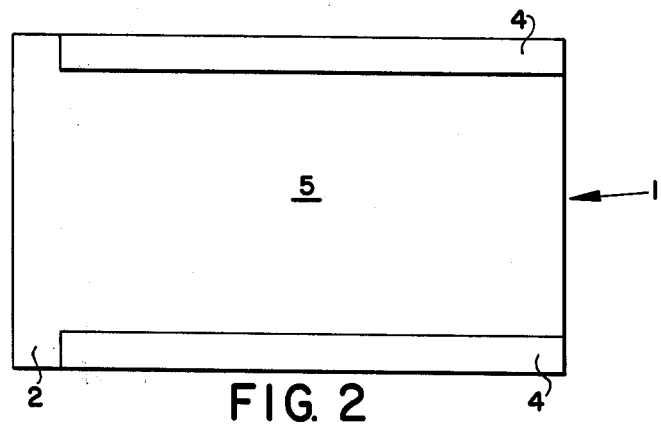 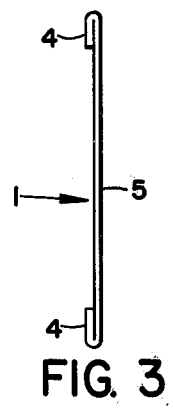
FIG. 2                FIG. 3
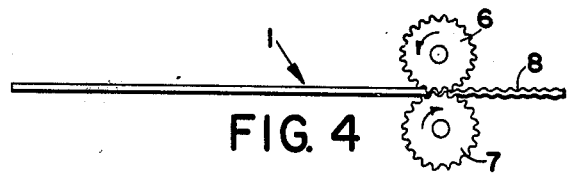
FIG. 4
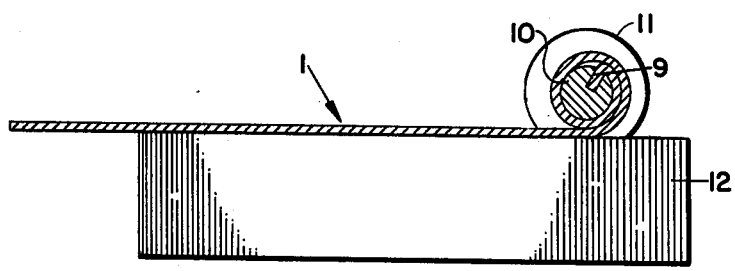
FIG. 5

SELF-RETRACTING IMBIBITION CHAMBER FOR CAMERAS AND METHOD OF MAKING THE SAME

This invention relates to photography, and particularly to a novel compact imbibition chamber for cameras.

Photographic processes in which the processing of the finished print is commenced as soon as the exposure has been made have been highly developed and take various forms. The processes include those in which the photosensitive materials must be protected from light during the processing procedure, as well as those in which an opacifying composition is employed so that the exposed film unit may be passed through processing rolls and then immediately ejected into a lighted environment without interfering with the process. Typical of latter processes of this type are those involved in the preparation and processing of SX-70 Land film units, made and sold by Polaroid Corporation of Cambridge, Massachusetts.

For some purposes, it is desirable to limit the amount of opacifying composition included in a photographic processing fluid, such as the fluid used in the SX-70 film units. When such limited amounts of opacifier are used, it is necessary to keep the print in a light-protected environment until the processing is well advanced. In order to keep the size of a camera in which the film is exposed and processed to an acceptably compact size, it is undesirable to include an imbibition chamber in the camera. The difficulty is that the film cannot be pulled around a short radius, so that the length of the chamber would have to be added to the length of the film unit. One solution to this problem which has been proposed is to provide a temporary imbibition shield in the form of a plate having light protecting edges at its sides to be used in combination with a film unit having an opaque layer on one side and with a light-sensitive layer ejected into shielded relationship with an opacification device so that it can be left in a light-protected environment, although outside of the camera, for any desired length of time. In order to reduce the size of the camera, the plate is hinged to the camera so that it can be folded back against the camera body when not in use. Such apparatus is shown and described in U.S. Pat. No. 3,369,470, issued on FEB. 20, 1968 to Rogers B. Downey for Camera Apparatus and assigned to the assignee of this application. More restricted light protecting properties have been made available in the form of a self-retracting temporary light shield of the kind shown and described in U.S. Pat. No. 3,938,167, issued on Feb. 10, 1976 to J. N. Amey and A. S. Ivester for Film Catcher, and in U.S. Pat. No. 3,940,774, issued on Feb. 24, 1976 to A. S. Ivester for Opaque Shade, both assigned to the assignee of this application. In this apparatus, a coiled, relatively opaque carbon-filled Mylar tab is provided. A film unit just passing through the processing rolls of the camera is ejected into the curl of the coiled tab in such a manner that it is protected by the curled material as it is uncurled until it leaves the processing rolls, at which time it comes out of engagement with the temporary protecting tab and comes into position for removal by the user of the camera. Such apparatus is extremely convenient in use. And the additional dark imbibition time provided is not paid for at the expense of much additional camera complexity or material, because the device is self-retracting into a tight coil immediately after use and thus does not take up much space in the camera.

The object of this invention is to attain the advantages of a longer dark imbibition period while achieving the compactness available with the tightly coiled construction of the above-cited U.S. Pat. Nos. 3,938,167 and 3,940,774.

Briefly, the above and other objects of the invention are attained by a novel imbibition chamber construction in which a film receiving imbibition chamber is provided in the form of a tightly coiled helix of springy opaque sheet material which has been formed with fluted side flanges that will hold the film unit with its photosensitive face in contact with the face of the opaque sheet. The structure is initially tightly coiled into a compact configuration but is readily extended into a relatively flat configuration by encounter with the film unit.

The process of making an imbibition chamber in accordance with the invention, and the apparatus and its mode of operation, will best be understood in the light of the following detailed description, together with the accompanying drawings, of preferred embodiments of the invention. In the drawings, FIG. 1 is a schematic plan sketch of a blank used in forming an imbibition chamber in accordance with the invention;

FIG. 2 is a schematic plan sketch of the structure of FIG. 1 after folds have been made;

FIG. 3 is an end view of the structure of FIG. 2;

FIG. 4 is a fragmentary schematic sketch illustrating a step in the process of manufacturing an imbibition chamber in accordance with the invention;

FIG. 5 is a schematic elevational sketch illustrating another step in the manufacture of an imbibition chamber in accordance with the invention;

Figure 6:
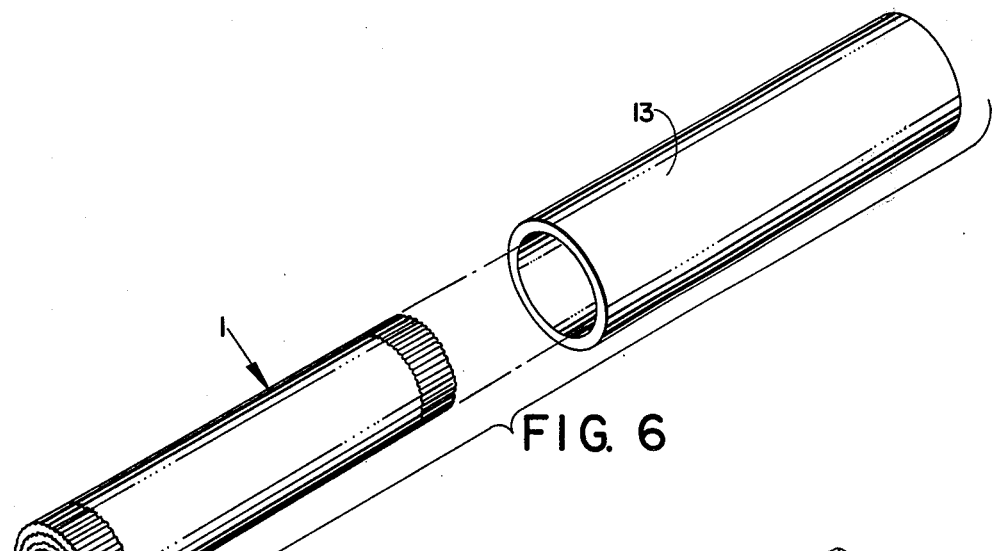
FIG. 6 is a schematic diagrammatic sketch illustrating another step in the process of the invention.

Referring to FIG. 1, an imbibition chamber in accordance with the invention is preferably made of a material that can be heat-cured to a flexible springy condition in which it will serve as a spring biased to return to the position in which it is cured. A presently preferred material for this purpose is polyvinyl fluoride filled with sufficient carbon black to make it opaque. Such a material can be purchased under the trademark TEDLAR from the E. I. duPont de Nemours Corporation of Newark, N.J.

The material used may be 1½ mils in thickness. Other materials with similar properties may, of course, be used; for example, Mylar filled with carbon black would also serve the purposes of the invention. Other suitable resins, and other suitable opacifiers, will occur to those skilled in the art, and may be employed without departing from the scope of the invention in its broader aspects.

As indicated in FIG. 1, the blank 1 has corners cut out to form an extending tab 2 that will be employed later to fasten the apparatus into the camera. Cuts 3 are made for purposes to be described. The material is then folded along the dotted lines in alignment with the cuts 3, bringing side flanges 4 over the central portion 5 of the unit 1, where they are creased down hard at the edges as best shown in FIG. 3.

Figure 8:
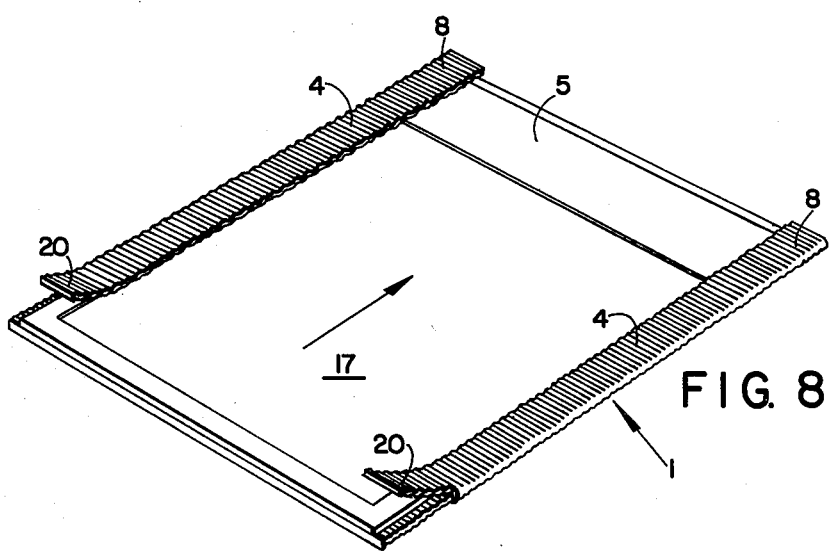
FIG. 8 is a fragmentary perspective sketch illustrating the operation of the imbibition chamber in accordance with the invention.

The flanges 4 and adjacent portions of the material 5 are then fluted in any convenient manner. For example, as illustrated in FIG. 4, they may be passed through a pair of meshing gears 6 and 7, once through the gears for each side, so that the fluting as indicated at 8 is produced. The result is best shown in FIG. 8. While FIG. 4 shows the unit 1 very schematically as a single sheet, it will be apparent that a double thickness goes through the rolls. The same convention is used in FIGS. 5 and 6, for simplicity.

The folded unit with fluted edges formed as just described is next wound up on a mandrel. For that purpose, the end of the flanges 4 and central portion 5 are inserted in a slot 9 formed in a rod 10, for example, an eighth inch rod or the like.

An operator then grasps a knob 11 fixed to the rod 10 and rolls the unit 1 up on the rod on a suitable support, here shown as a block 12. After the unit 1 is rolled up more or less loosely on the rod 10 in this fashion, it is next cinched tightly on the rod 10 and inserted into a tube, such as a brass tube or the like, illustrated at 13 in FIG. 6. For this purpose, the cinched roll 1 on the rod 10 is first inserted fully into the tube 13. The rod is then unwound slightly to release the end of the unit from the notch 9, so that the rod 9 may now be withdrawn from the tube. The unit as in the tube 13 is then cured in an oven at 300 degrees for fifteen minutes.

Figure 7:
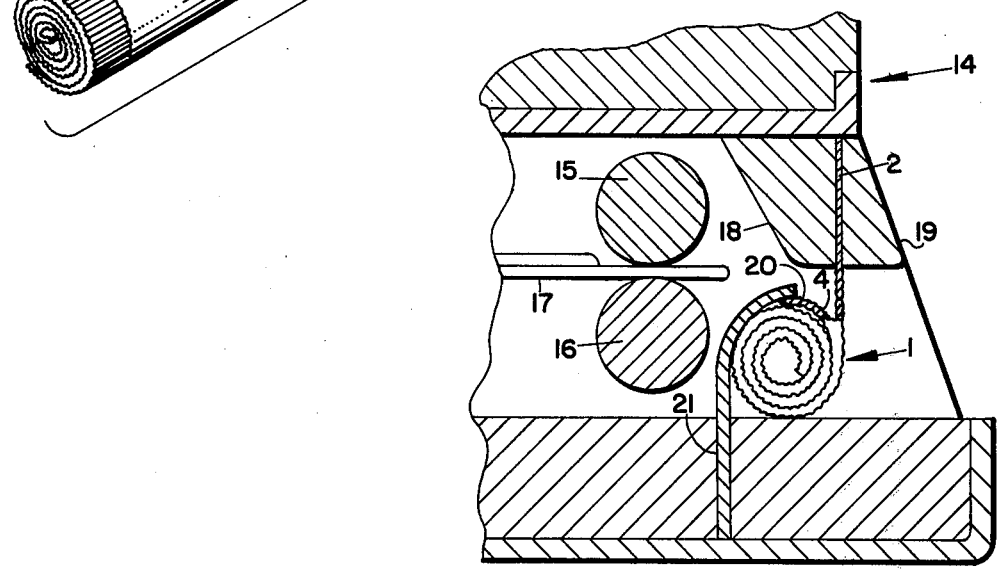
FIG. 7 is a fragmentary cross-sectional elevational sketch, illustrating an imbibition chamber in accordance with the invention installed in a camera.

Next, the heated unit in the tube 13 is cooled, then removed from the tube. It is now ready for installation in the camera in the manner suggested in FIG. 7, and as more fully described in the above-cited U.S. Pat. Nos. 3,938,167 and 3,940,774. As schematicaly indicated, the camera 14 is provided with a pair of processing rolls 15 and 16 between which film units schematically shown at 17 are adapted to be passed for processing. The end 2 of the unit 1 is fixedly mounted in any convenient manner between a pair of members 18 and 19 as suggested in FIG. 7. Ends 20 of the flanges 4, which are freed by the operation of making the cuts 3 as described above in connection with FIG. 1, are next secured inside of a guide member 21 serving the purpose as described in the above-cited patents. By that arrangement, when the film unit 17 is driven out through the rolls, it will be caught between the flanges 4 and the main portion 5 of the imbibition chamber and be driven into it in the manner suggested in FIG. 8, with the end of the unit 1 remaining coiled as shown in FIG. 7 until it is flattened out by the entry of the film unit 17. Once ejected from the processing rolls, the film unit will remain in the imbibition chamber held by the flanges 4 until it is removed by the user.

The provision of the fluted edges in the apparatus of the invention makes it possible to coil the unit 1 as described. The apparatus in the form shown in FIG. 2 cannot be rolled up with useful results, because the flanges 4 would crease and wrinkle, forming a structure that would stop the end of the film unit as it was inserted. The reason why rolling the structure of FIG. 2 up would cause creases and wrinkles is that the length of the flanges 4 is the same as the length of the underlying structure 5, but in the coiling process the flanges 4 are coiled about a smaller radius. There is thus a progressive stress buildup that effects the creasing. Fluting the sides of the unit appears to more or less distribute the radius between the flange and the base sheet, at least to a sufficient extent so that the undesirable effect of creasing is not encountered.

While the invention has been described with reference to the details of a presently preferred embodiment, many changes and variations will occur to those skilled in the art upon reading this description. Such can obviously be made without departing from the scope of the invention.

Having thus described the invention, what is claimed is:

1. In combination with a camera having a pair of processing rolls through which a film unit may be advanced for processing, a tightly coiled helix of springy opaque material having inturned film retaining flanges fluted with adjacent regions of said material to permit coiling without creasing, said coiled helix being mounted in said camera in front of said rolls with portions of said flanges spread from a projecting end flap of said helix to receive the end of a film unit passing out between said rolls.

2. The apparatus of claim 1, in which said flanges are inside of the helix relative to said adjacent regions integral therewith.

3. Imbibition means for use with photographic apparatus of the type having apparatus for processing and advancing a film unit therefrom, said imbibition means comprising:

a flexible structure resiliently structured to assume a configuration coiled lengthwise of itself when in an unstressed condition, said flexible structure including a first section arranged to overlie at least the exposed photosensitive surface of the film unit when said structure is uncoiled, and a pair of spaced apart flanges positioned to respectively overlie portions of the inside face of said first section immediately adjacent the longitudinal edges of said first section and respectively connected to the longitudinal edges of said first section so as to slidably capture the opposed longitudinal edges of the film unit as its leading edge is introduced into said coiled flexible structure causing said flexible structure to progressively uncoil, said structure thereby protecting the photosensitive surface of the film unit from actinic light while releasably retaining the film unit therewithin, said flanges and said longitudinal edges of said first section being fluted laterally of said structure to preclude undesirable creasing of said structure when in its coiled configuration.

4. The imbibition means of claim 3 wherein said spaced apart flanges respectively include corresponding end portions in non-connected relation with respect to said longitudinal edges of said first section, said non-connected flange end portions being readily bendable away from said first section to accommodate receipt and capture of the leading edge of an advancing film unit between said flanges and said first section.

5. The imbibition means of claim 4 wherein said first section extends longitudinally beyond the ends of said flanges to accommodate connection of said flexible structure to the camera apparatus.

6. The apparatus of claim 4 wherein said flanges reside inside adjacent portions of said first section when said flexible structure assumes said coiled configuration.

7. A camera apparatus of the type comprising:
a housing having a film exit slot therein;
means for defining a film exposure plane within said housing;

means for processing an exposed film unit and advancing the film unit from said housing through said film exit slot; and a flexible imbibition structure in fixed connection with respect to said housing and resiliently structured to assume a configuration coiled lengthwise of itself when in an unstressed condition, said flexible structure including a first section arranged to overlie at least the exposed photosensitive surface of the film unit when said structure is uncoiled as the film unit is advanced from said housing and a pair of spaced apart flanges positioned to respectively overlie portions of the inside face of said first section immediately adjacent the longitudinal edges of said first section and respectively connected to the longitudinal edges of said first section so as to slidably capture the opposed longitudinal edges of the film unit as its leading edge is introduced into said coiled flexible structure during said film advancement causing said flexible structure to progressively uncoil, said structure thereby protecting the photosensitive surface of the film unit from actinic light while releasably retaining the film unit therewithin, said flanges and said longitudinal edges of said first section being fluted laterally of said structure to preclude undesirable creasing of said structure when in its coiled configuration.

8. The photographic apparatus of claim 7 wherein said spaced apart flanges of said imbibition structure respectively include corresponding end portions in non-connected relation with respect to said longitudinal edges of said first section, said non-connected flange end portions being readily bendable away from said first section to accommodate receipt and capture of the leading edge of an advancing film unit between said flanges and said first section.

9. The photographic apparatus of claim 8 including:

means for guiding and holding an advancing film unit, said guiding and holding means including two spaced apart resilient guide members connected respectively to said non-connected flange end portions, together with a third guide member connected in fixed opposing spaced relation with respect to said resilient guide members thereby operating to capture and guide an advancing film unit between said resilient guide members and said third guide member, said third guide member also connecting to said first section so as to direct the advancing film unit between said flaanges and said first section.

10. The photographic apparatus of claim 9 wherein said first section extends longitudinally beyond the ends of said flanges to accommodate connection thereof to said third guide member.

11. The photographic apparatus of claim 7 wherein said flanges reside inside adjacent portions of said frist section when said flexible structure assumes said coiled configuration.

* * * * *